UNITED STATES PATENT OFFICE.

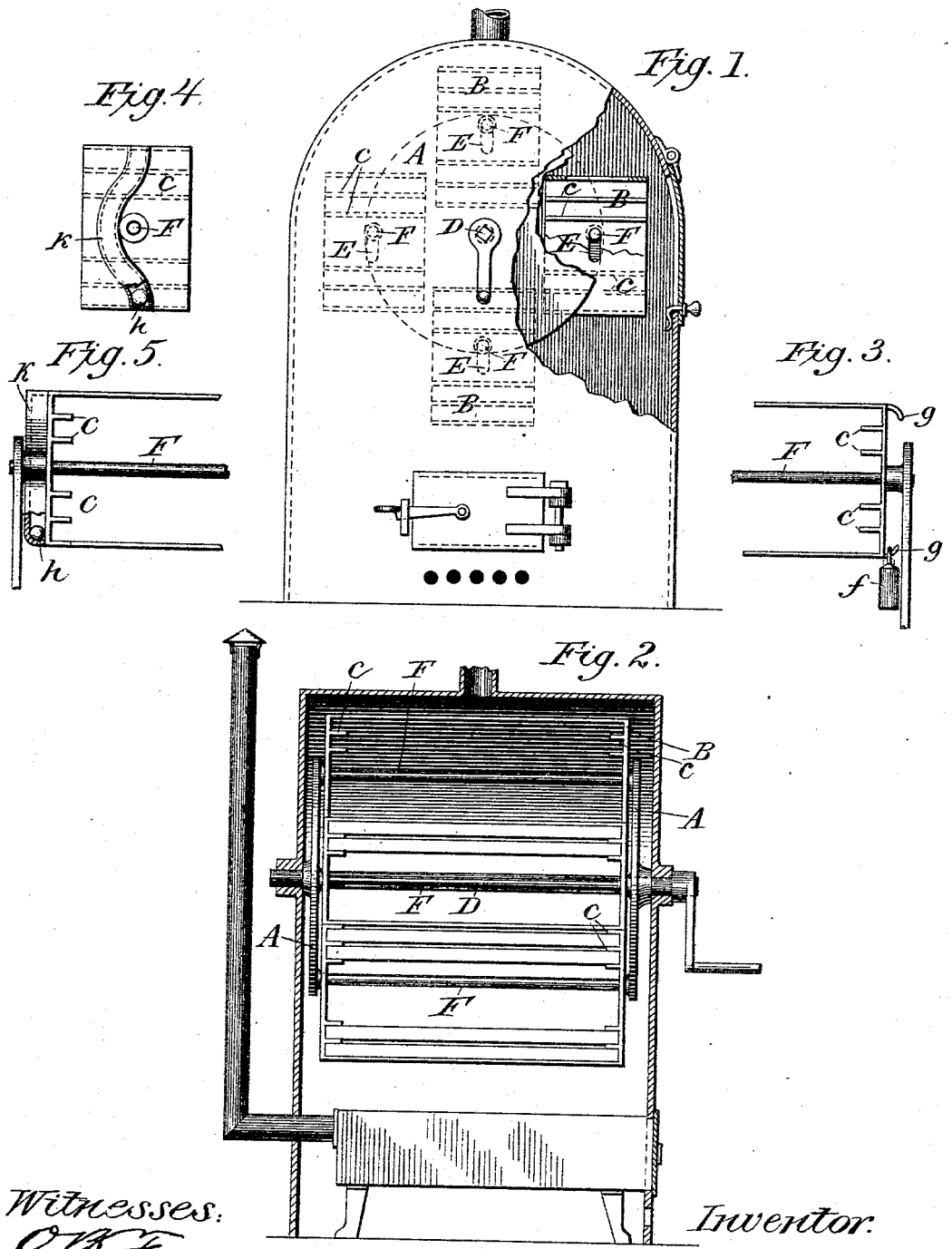

DAVID L. SMITH, OF SAN FRANCISCO, CALIFORNIA.

FRUIT-DRIER.

SPECIFICATION forming part of Letters Patent No. 412,131, dated October 1, 1889.

Application filed April 10, 1888. Serial No. 270,226. (No model.)

*To all whom it may concern:*

Be it know that I, DAVID L. SMITH, of San Francisco, State of California, have invented an Improvement in Fruit-Driers, of which the following is a true and correct description.

My invention relates to that class of machines intended for drying fruit and other articles in which a series of trays or tray-holders are suspended at the periphery of a frame, wheel, drum, or cylinder, so as to be carried around inside of a hot-air chamber by the rotation of the wheel, drum, or cylinder, and thus be uniformly brought in contact with the varying grades of heated air in the different parts of the hot-air chambers.

It is a well-known fact that the juices in green fruit when exposed to heat for the purposes of drying or cooking have a tendency to stew out and settle to the bottom, and thereby cause the fruit to adhere to the pan or plate or whatever it may be laid upon to dry or cook; and unless the fruit is turned at intervals during the drying process these juices become a means whereby the fruit adheres to the pan or tray, thereby losing much of its substance as well as its flavor. For this reason it is the custon to turn the fruit or trays containing the fruit over at intervals during the process of drying, so that the juices will be retained in the body of the fruit when dried and ready for the market. The usual method of doing this is to take each piece of fruit or tray separately and turn them over.

My invention consists in the combination, with revolving frames, of pivoted reversible hanging cages mounted thereon, having trays above and below their centers, and so constructed as to retain their upright position when either half is below the central support, as hereinafter set forth, and pointed out in the appended claim.

Referring to the accompanying drawings, Figure 1 is a front elevation of my drying apparatus and showing the hanging frames in dotted lines, part of the casing and wheels being broken away. Fig. 2 is a side elevation showing the heater and swinging frames, the outer casing being shown in section. Fig. 3 is a section of a swinging frame, showing a removable weight for holding the frames in position. Figs. 4 and 5 show an automatically-shifting weight to accomplish the same purpose.

Let A represent the rotary frame, wheel, drum, or cylinder, revolving with the shaft D, which carries the hanging frames B. These frames I construct sufficiently high to permit one or more trays to be placed in them above its middle line and one or more below its middle line.

$c$ $c$ represent the ledges or shelves on which the trays rest and are supported, and may be variously constructed to hold the trays. I then suspend this frame at the periphery of the wheel, drum, or cylinder A by means of a pin or rod F, which pin or rod is rigidly fastened to the periphery of the wheel, drum, or cylinder. If a rod is used, it may pass from one wheel to the other; or if a pin is used in place of the rod it is fastened securely to the periphery of each wheel or drum, and of sufficient length and strength to sustain the required frame, and placed at such equal distances from each other on the wheel as to admit the frames to pass each other in their revolutions around the shaft D, as well as to be reversed or turned upside down on the pin or rod F without interference with the other frames, and then I provide means for holding the frames upright when either end is up. This can be done in various ways, three of which are represented and shown in the drawings. The first means (shown in Fig. 1) is to make a slot E in each head or end of the frame, which extends both above and below the center, and through which the pin F passes, so that when the frame stands in either position the greater weight will be below the center of the pin or rod F, and thus hold the frames in position. The second means, (shown in Fig. 3) is a removable weight $f$, which can be suspended on a hook $g$ on the outer side of the frames, no matter which end of the frames is underneath. In this case the hole through which the pin or rod F passes need not be slotted or elongated. The third means consists of a ball or shifting weight $h$, (shown in Figs. 4 and 5,) which is arranged to run from one end to the other of a conduit or tube K in each head or end of the frame. In this case the weight shifts itself to the lower portion of the tube when the frame is turned. By this arrangement the turning of the frames turns all the trays upside down, so that no handling of the fruit or separate trays is necessary, and the fruit is consequently turned so as to accomplish the drying without loss of the juices.

Having thus described my invention, what I claim, and desire to secure by Letters Patent, is—

The combination, with the revolving frames, of the pivoted reversible hanging cages mounted thereon, having trays above and below their centers, and constructed, as described, so as to retain their upright position when either half is below the central support, substantially as above described.

DAVID L. SMITH.

Witnesses:
O. B. FENNER,
E. H. THARP.